United States Patent [19]
Miyazaki et al.

[11] Patent Number: 4,674,436
[45] Date of Patent: Jun. 23, 1987

[54] FILM FORMING APPARATUS

[75] Inventors: Toshihiko Miyazaki, Tokyo; Etsuko Sugawa, Machida; Yoshinori Tomida; Hirohide Munakata, both of Yokohama; Yukuo Nishimura, Sagamihara; Ken Eguchi, Yokohama, all of Japan

[73] Assignee: Canon Kabushiki Kaisha, Tokyo, Japan

[21] Appl. No.: 723,923

[22] Filed: Apr. 16, 1985

[30] Foreign Application Priority Data

| Apr. 19, 1984 | [JP] | Japan | 59-77529 |
| Apr. 19, 1984 | [JP] | Japan | 59-77530 |
| Apr. 19, 1984 | [JP] | Japan | 59-77532 |
| Apr. 19, 1984 | [JP] | Japan | 59-77533 |

[51] Int. Cl.4 .............................................. B05C 3/10
[52] U.S. Cl. .................................. 118/402; 118/423; 118/425
[58] Field of Search ............... 118/402, 403, 423, 425; 427/263, 281

[56] References Cited

U.S. PATENT DOCUMENTS 4,490,413 12/1984 Stimson .......................... 427/263 X
4,511,604 4/1985 Barraud et al. ................. 118/402 X Primary Examiner—Evan K. Lawrence
Attorney, Agent, or Firm—Fitzpatrick, Cella, Harper & Scinto

[57] ABSTRACT

An apparatus for forming a monomolecular film or a monomolecular built-up film on a substrate, which comprises a tank, a frame for dividing a liquid surface in the tank and a support for moving the substrate horizontally in the liquid without disordering the liquid surface within the frame which contains the film.

6 Claims, 13 Drawing Figures

FILM FORMING APPARATUS

BACKGROUND OF THE INVENTION

1. Field of the Invention

This invention relates to a film forming apparatus appropriate for forming a monomolecular film or a monomolecular built-up film (hereinafter referred to as "LB film"), and particularly to the film forming apparatus which can reliably obtain an LB film in which molecular layers are arranged in a predetermined order.

2. Description of the Prior Art

Until recently, inorganic substances, which are relatively easy to handle, have been exclusively used in semiconductor and optics technology. One reason might be that the technology of organic chemistry was far behind that of inorganic chemistry.

However, the technology in organic chemistry has strikingly progressed in recent years and, moreover, the development of materials composed of inorganic substances seems to have slowed down. Therefore, a functional organic material surpassing the available inorganic substances has been desired. The advantages of the organic material are low price, easy production, excellent functional properties and so on. Further, organic materials have been developed recently which have superior heat-resistance and mechanical strength to those in the prior arts. With such a technical background, several research organizations presented recently he idea of utilizing an organic thin film in place of the conventional inorganic thin film for a part or the whole of the functional portion (principally a thin layer portion) of an integrated circuit device including a logical element, a memory device, a photoelectric transducing device, etc. and of optical devices including a microlens array, an optical wavepath, etc. They also presented the idea of preparing a molecular electron device by giving a function of a logic element, memory device or the like to an organic molecule, or of preparing a logic element comprised of a bio-material (e.g., biochips).

The organic thin film, which is the main constituent element of such devices, is formed by a monomolecular built-up method. The monomolecular built-up method (or Langmuir-Blodgett method) is a method which comprises forming a monomolecular film which is spread in an orderly manner on a water surface by utilizing a hydrophilic or hydrophobic property of a molecule having a hydrophilic or hydrophobic group, respectively, and transferring the monomolecular film onto a substrate surface, and it is possible to form the monomolecular film or the monomolecular built-up film in which the monomolecular films are built up on the substrate.

Until recently, referring to FIG. 7, a frame in the apparatus used in this method is horizontally placed to divide a water surface 3 in the inside of a shallow and broad rectangular water tank 1. The frame 2 acts as a two-dimensional cylinder and the rectangular floating element 4 is floated on the water surface in the inside of the frame 2. The floating element 4 has a width a little smaller than the inner width of the frame 2 and can smoothly move forward or backward as a two-dimensional piston. In order to permit floating element 4 to move from side to side, the floating element 4 is connected through a wire 5 with the winding device 6 using a motor or the like.

During formation of the monomolecular film, the constituent of the film dissolved in a volatile solvent such as benzene, chloroform and the like is added dropwise to the water surface 3. The monomolecular film remains on the water surface 3 after evaporation of the solvent, showing a two-dimensional behavior on the water surface 3. When the surface density of molecules in low, the monomolecular film is called a two-dimensional gaseous film. The floating element 4 is slowly moved forward, i.e. toward the right side in the drawing, to reduce the extension of water surface 3 on which a monomolecular film is spread, resulting in an increase in surface density. Then, the interaction between the molecules is intensified and the gaseous film is converted to a two-dimensional solid film through a two-demensional liquid film. In the solid film, the molecules are arranged in uniform orientation, and ultimately the solid film has a high orderliness and a uniform ultrathinness as required for a material constituting a semiconductor.

As a method for transferring the monomolecular film onto the surface of a substrate 7 from the water surface 3, there may be used a vertical dipping method by which the monomolecular film can be transferred by moving up and down the substrate 7 supported by a substrate holder 8 in a vertical direction 9, while applying a constant surface pressure suitable for a build-up operation to the monomolecular film on the water surface 3.

In the case of the vertical dipping method, three kinds of film structure, as shown in FIG. 8, can be obtained. That is, there are a type X where the monomolecular film 10 can adhere only when the substrate 7 is dipped, as shown in FIG. 8(a), a type Y where the monomolecular film 10 can adhere both when the substrate 7 is dipped and when it is withdrawn, as shown in FIG. 8(b), and a type Z where the monomolecular film 10 can adhere only when the substrate 7 is withdrawn, as shown in FIG. 8(c). In the molecule in FIG. 8, 11 is a hydrophilic moiety and 12 is a hydrophobic moiety.

When, for example, a heteroconstruction built-up film of the type Y (constituent molecules of the monomolecular films being different in the direction of built-up) as the built-up film in FIG. 3 is produced by using an apparatus of FIG. 7 (cf. FIG. 8(b)), that is, when a heterojunction is formed between hydrophilic groups 11a of film A and hydrophilic groups 11b of film B, a substrate is moved up and down to attach film A1, and film A2, and the monomolecular film A on the water surface is discarded while the substrate is kept in water. After cleaning the water surface, a monomolecular film B is formed on the water surface, and the substrate is moved up and down to attach film B, and film B2 followed by further attaching film A3 according to the same procedure.

However, upon the exchange of one film for another film, it takes a long time to clean the water surface, and the greater the number of films, the longer the time required for cleaning.

Also, during the cleaning, the water surface is ruffled and the water level varies, and thereby the build-up film on the substrate in the vicinity of the water surface is not orderly arranged and can not be used.

The conventional apparatus as described above is too time-consuming and requires much labor for the formation of the heteroconstruction built-up film, that is, a film constituted of different kinds of molecular layers.

In addition, a film which can still be used should be disadvantageously discarded.

SUMMARY OF THE INVENTION

An object of the present invention is to provide a film forming apparatus capable of reliably producing LB film in which molecular layers are arranged in order.

Another object of the present invention is to provide a film forming apparatus capable of forming a heteroconstruction built-up film in which different kinds of molecular layers are arranged in order in various manners of built-up construction.

A further object of the present invention is to provide a film forming apparatus capable of forming particularly in a short time with little labor a hetereoconstruction built-up film in which different kinds of molecular layers are arranged in a predetermined order.

According to one aspect of the present invention, there is provided an apparatus for forming a monomolecular film or a monomolecular built-up film on a substrate which comprises a tank, a frame for dividing a liquid surface in the tank and means for moving the substrate horizontally in the liquid without disordering the liquid surface within the frame which contains the film.

According to another aspect of the present invention there is provided an apparatus for forming a monomolecular film or a monomolecular built-up film on a substrate, which comprises a tank, a frame for dividing a liquid surface in the tank and means for moving the substrate horizontally in the liquid without disordering the liquid surface within the frame which contains the film and moving the substrate vertically through the liquid surface.

According to a further aspect of the present invention there is provided an apparatus for forming a monomolecular film or a monomolecular built-up film on a substrate, which comprises a tank, a frame for dividing a liquid surface in the tank, a plurality of float means within the frame and means for moving the substrate horizontally in the liquid without disordering the liquid surface within the frame which contains the film.

According to still another aspect of the present invention, there is provided an apparatus for forming a monomolecular film or a monomolecular built-up film on a substrate, which comprises a tank, a frame for dividing a liquid surface in the tank, a plurality of float means within the frame and means for moving the substrate horizontally in the liquid without disordering the liquid surface within the frame which contains the film and moving the substrate vertically through the liquid surface.

BRIEF DESCRIPTION OF THE DRAWINGS

FIG. 1 shows one embodiment of the present invention wherein

FIG. 4 shows another embodiment of the present invention wherein

FIG. 6 shows a still further embodiment wherein

DESCRIPTION OF THE PREFERRED EMBODIMENTS

The present invention will be explained in detail below, referring to embodiments shown in the Figures.

Figure 1A:
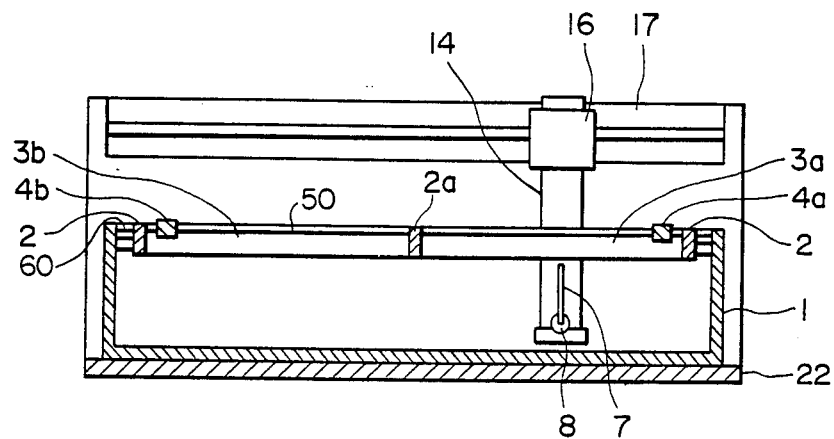
FIG. 1(a) is a sectional front elevation and FIG. 1(b) is a sectional side elevation.
Figure 1B:
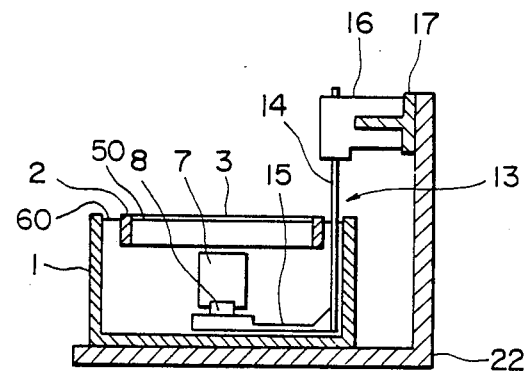

FIG. 1 shows one embodiment of the present invention wherein FIG. 1(a) is a sectional front elevation and FIG. 1(b) is a sectional side elevation.

1 is a water tank, 2 is a frame which divides the liquid surface in the water tank into two regions, that is, a film spreading region 50 and a film non-spreading region 60. 13 is a substrate-supporting member provided only in the film non-spreading region 60. The substrate-supporting member 13 comprises an up-and-down rail part 14, an arm part 15 making a right angle with the rail 14, and a substrate holder 8 fitted to the tip of the arm part 15. A moving part 16 can move to the right and the left along rail 17 and can move up and down the up-and-down rail part 14. The moving part 16 has a built-in motor (not shown) for moving up and down the up-and-down rail part 14 and a motor (not shown) for moving to the right and the left the moving part 16.

A frame (for division) 2a inside of the rectangular water tank 1 is horizontally placed to divide the surface within frame 2 into two surfaces, that is, water surfaces 3a and 3b. Floating elements 4a and 4b are floated on water surfaces 3a and 3b, respectively, inside of the frame 2. A moving device and a surface tension meter (not shown) are provided to keep constantly an optional surface tension of the regions of the water surfaces 3a and 3b. When a substrate 7 is supported by the substrate holder 8, the up-and-down rail part 14 is lifted using the built-in motor in moving part 16.

Figure 2:
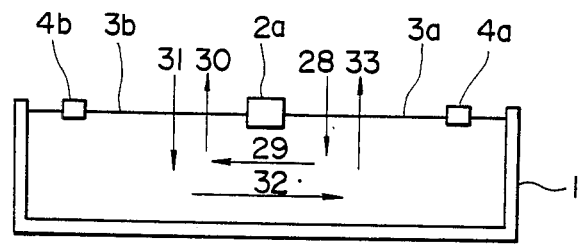
FIG. 2 shows schematically the direction of movement of a substrate.
Figure 3:
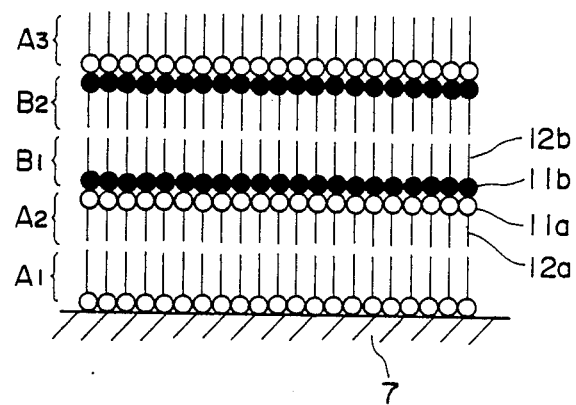
FIG. 3 shows schematically a structure of a heteroconstruction built-up film which can be easily obtained by an apparatus according to the present invention.

Substrate holder 8 by which substrate 7 is supported can move to the right and the left along the rail 17 by the built-in motor in moving part 16 through the up-and-down rail part 14. After immersing substrate 7 in the water, for example, constituents A and B of monomolecular films is added dropwise to 3a and 3b, respectively, and the surface tension is supplied using floating elements 4a and 4b to form the monomolecular films A and B. The films A and B are built up by moving substrate 7 up and down and to the right and the left in the water (FIG. 2 shows a movement direction of the substrate in the built-up operation as described above. The substrate is moved in the order of arrows 28-33.) to form easily a heteroconstruction built-up film as shown in FIG. 3. A built-up film having a heterojunction between a hydrophilic group and a hydrophilic group as shown in FIG. 3 has an advantage that functional portions of molecules of different kind come very near to each other in the case where the molecules having a function on its hydrophilic portion are built up.

By dividing the water surface for spreading the molecules into two regions, the labor for exchange of the film which is required in the conventional apparatus can be omitted in the apparatus of the present invention as described above. It is also possible to increase the number of combinations of the floating elements within the frame 2 to make three or more of the water surfaces for spreading the molecule.

In the embodiment as described above, the substrate is horizontally moved in the water under the monomolecular film. Alternatively, the film may be moved by the floating element while the substrate is moved only up and down. In the above, there is mentioned an embodiment in which the monomolecular built-up films of two kinds are spread on the water surface. However, by using a circle water tank, various kinds of films can be built up.

Figure 4A:
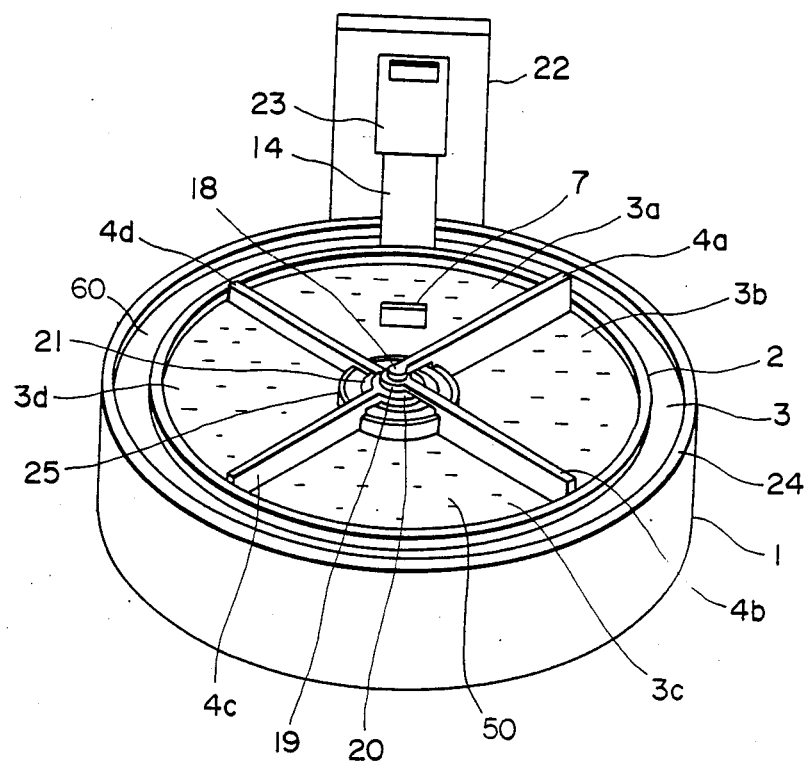
FIG. 4(a) is a perspective view and FIG. 4(b) is partial plane view of a main portion in a driving means.
Figure 4B:
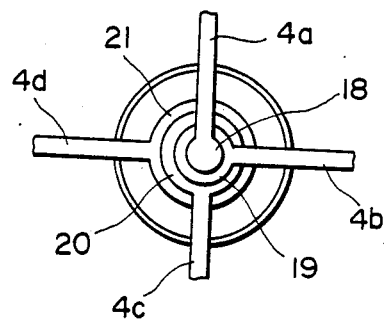

FIG. 4(a) shows another embodiment as described above. A frame 2 is horizontally placed on a water surface 3 to divide its surface into two regions, that is, a film spreading region 50 and a film non-spreading region 60. The substrate-supporting member is provided only at the film non-spreading region through the water surface. The frame 2 is horizontally placed on the water surface 3 inside the circle water tank 1. The surface inside the frame is divided into four regions of 3a, 3b, 3c and 3d by floating elements 4a, 4b, 4c and 4d. The floating element 4a is fixed to a columnar rotation shaft 18; the floating element 4b is fixed to the columnar ratation shaft 19; the floating element 4c is fixed to the columnar rotation shaft 20; and the floating element 4d is fixed to the columnar rotation shaft 21. FIG. 4(b) shows a fixation state of the rotation shaft and the floating element. The rotation centers of the rotation shafts are all at the same position, but these shafts can independently be rotated. The rotation shafts 18, 19, 20 and 21 can independently be rotated by motors (not shown), placed under the water tank. Floating elements 4a, 4b, 4c and 4d revolve on the rotation shafts 18, 19, 20 and 21 respectively, by a motor under the water tank to move the monomolecular film, and thereby to adhere the monomolecular film to substrate 7. Substrate 7 is moved by an up-and-down rail part 14 passing through an up-and-down movement system 23 fitted to a base 22. The substrate holder is placed on an arm part in the water of the up-and-down rail part 14, and the substrate 7 is supported by the holder 8. The up-and-down rail part 14 is placed between the frame 2 and an outer wall 24 of the water tank 1. Thereby, the movement does not cause ruffles on the water surface inside the frame 2.

Surface peressure meters (hot shown) are connected with the floating elements 4a, 4b, 4c and 4d to control the surface pressure of the monomolecular films spread on the water surfaces 3a, 3b, 3c and 3d to an optional value by moving the floating elements using motor under the water tank.

The monomolecular film may be formed on each of the surfaces divided into four regions. However, in consideration of the state of the monomolecular film, it is desirable to form no film, or to form a gas film, on one of the four regions (As the case may be, too high surface pressure occurs by the movement of the floating elements.). 25 is a wall provided inside the water tank.

Figure 5:
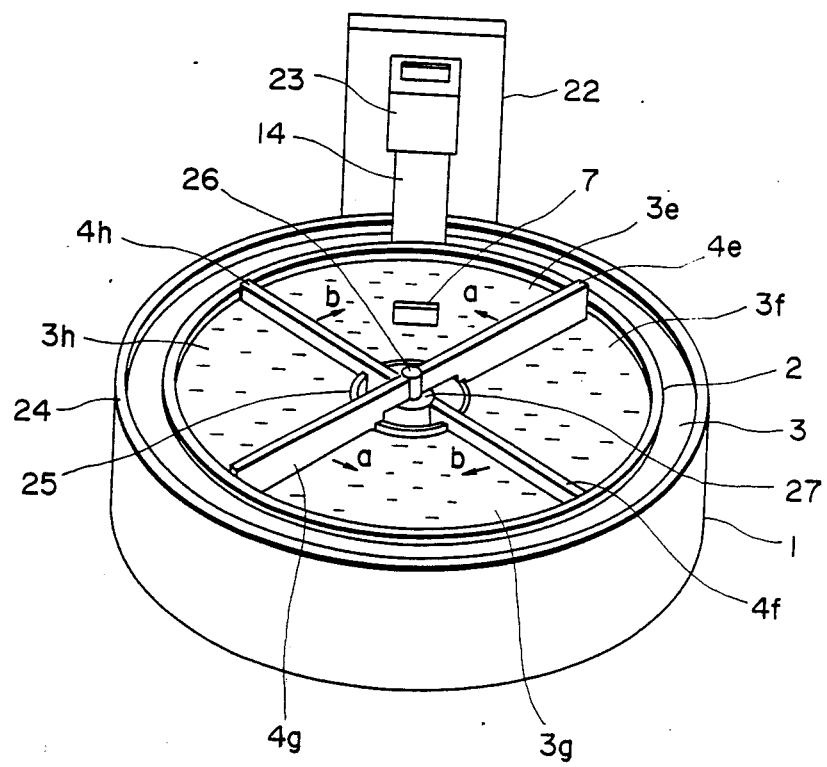
FIG. 5 shows a perspective view of a further embodiment.

FIG. 5 shows a schematic perspective view of a further embodiment. Floating elements 4e and 4g are fixed to a columnar rotation shaft 26 and floating elements 4f and 4h are fixed to a columnar rotation shaft 27. 25 is a wall provided inside the water tank. In the case where the rotation shafts are mutually rotated in opposite directions by motors (not shown) under the water tank, there appear a region defined by the frame and the floating element of which area decreases and a region defined by the frame and the floating element of which area increases, on the water surface. For example, in the case where the floating elements 4e and 4g are rotated to the direction of an arrow a and the floating elements 4f and 4h are rotated to the direction of an arrow b, the areas of regions 3e and 3g are reduced and the areas of regions 3f and 3h are extended.

As described in the case of the apparatus in FIG. 4(a), it is possible to control the surface pressure to an optional value of the monomolecular films since the floating elements are provided with surface pressure meters.

Figure 6A:
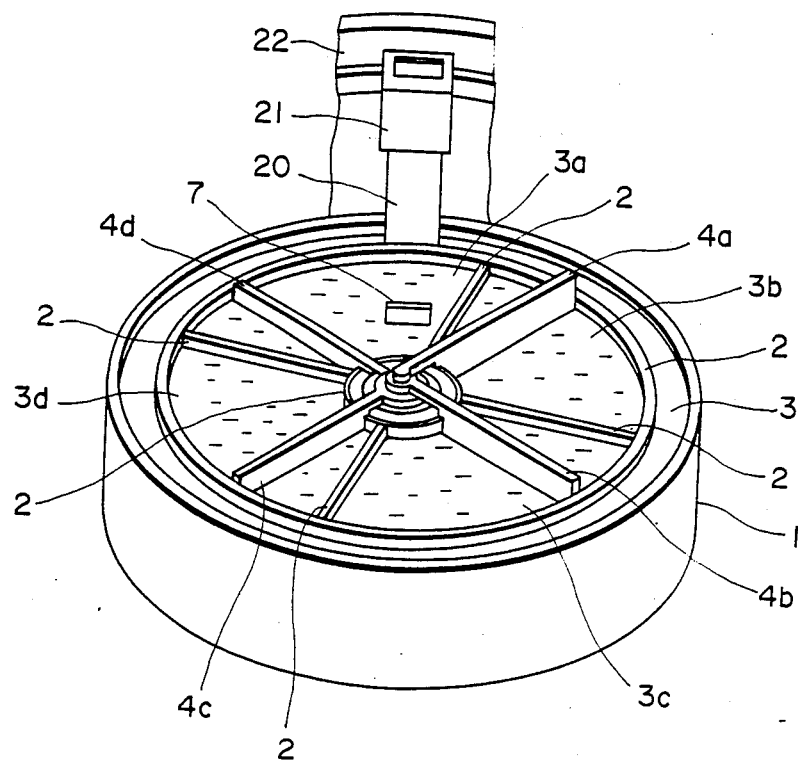
FIG. 6(a) is a perspective view and FIG. 6(b) is a partial plane view of a main portion in a driving means.

FIG. 6(a) shows still another embodiment of the present invention.

Various kinds of monomolecular film can be built up by an apparatus as shown in FIG. 6(a). The operation principle of this apparatus is similar to that of the apparatus shown in FIG. 4(a).

Figure 6B:
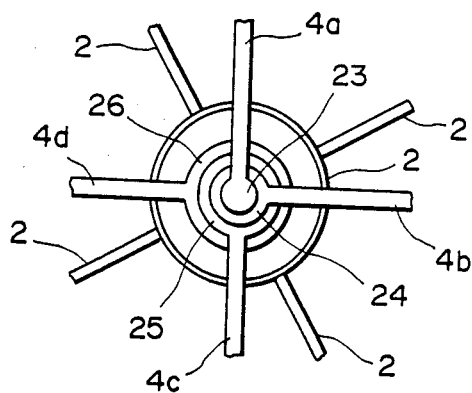
Figure 7:
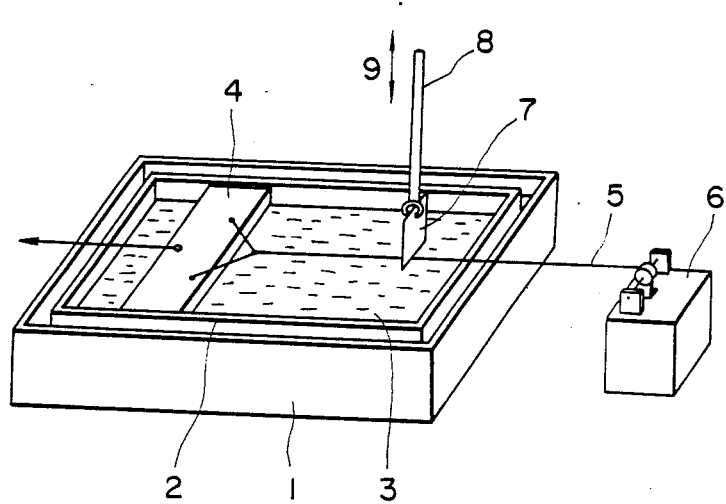
FIG. 7 shows schematically a perspective view of a conventional apparatus.
Figure 8A:
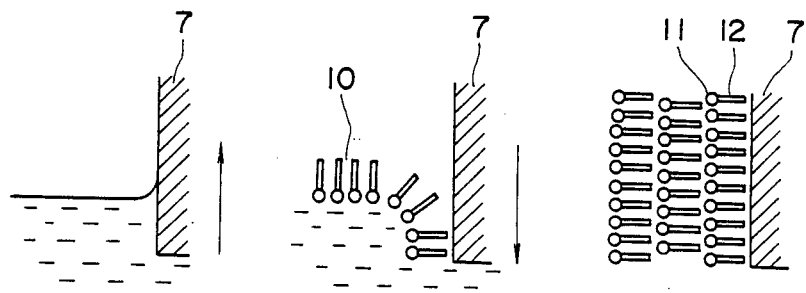
FIGS. 8(a), (b), and (c) show classification of structure of respective molecular orientation of monomolecular built-up films.
Figure 8B:
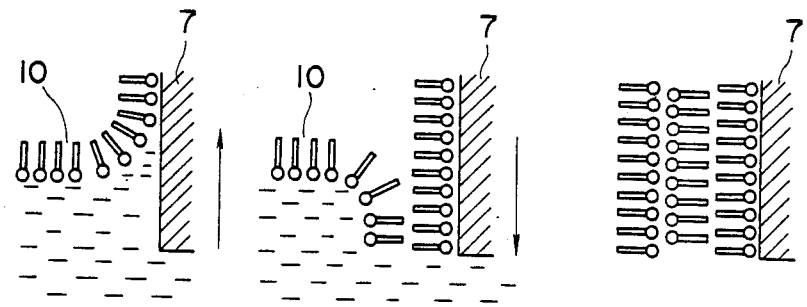
Figure 8C:
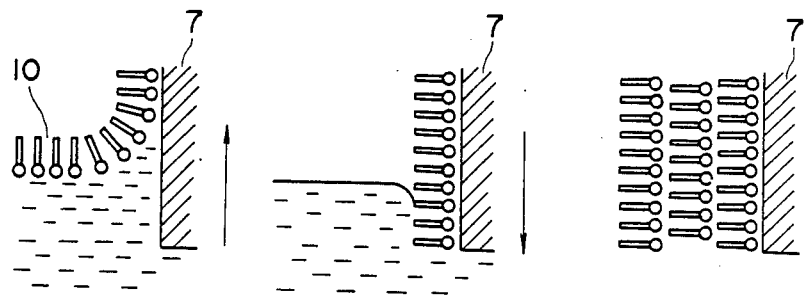

Constituent substances A, B, C and D of the monomolecular films are added dropwise to water surfaces 3a, 3b, 3c and 3d, respectively, to form the monomolecular films A, B, C and D by supplying the surface tension using respective floating elements 4a, 4b, 4c and 4d. Then, the substrate is moved up and down and is moved to the right and the left, that is, to a horizontal direction. Thereby the heteroconstruction built-up film is easily formed. FIG. 6(b) shows a partial plan view of one embodiment of the main portion of a driving means of the floating element and is similar to the portion as shown in FIG. 4(b). 21 is an up-and-down movement system, 20 is an up-and-down rail part, and 23, 24, 25 and 26 are rotation shafts.

In the present invention, the water surface may further be divided by increasing the number of the floating elements.

In each of FIG. 3, FIG. 5 and FIG. 6, the circle frame is provided in the circle water tank. However, the circle frame may be also provided in a square water tank.

In the figures, the number of the portions to which the substrate is fitted is only one, but may be two or more.

Using a device for adding dropwise the constituent of the film, the depleted amount of the constituent may be supplemented to a water surface other than the water surface through which the substrate is moved up and down.

The apparatus of the present invention is applicable to a horizontal deposition method and a rotary cylinder method.

According to the apparatus of the present invention, even when the substrate supporting member is moved for transferring the film to the substrate, the resulting shake of the liquid is checked by the frame and thereby the shake is not transmitted to the region for spreading the film, resulting in arranging in order a built-up film in the vicinity of the water surface. As the result, there is surely produced a monomolecular film where a desired molecular layer is orderly arranged, or a monomolecular built-up film where desired molecular layers are built up.

Further, the apparatus of the present invention can produce, in one liquid tank for spreading a film, the heteroconstruction built-up film where two or more kinds of monomolecular films are built up continuously by simple operation, i.e. moving a substrate in the liquid without necessity of exchanging the constituent substances of the monomolecular film as in the conventional apparatus.

We claim:

1. An apparatus for forming a monomolecular film or a monomolecular built-up film on a substrate, which comprises a tank, a frame for dividing a liquid surface in said tank and a means for moving the substrate horizontally in the liquid without disordering the liquid surface within said frame which contains said film.

2. An apparatus for forming a monomolecular film or a monomolecular built-up film on a substrate, which comprises a tank, a frame for dividing a liquid surface in said tank and a means for moving the substrate horizontally in the liquid without disordering the liquid surface within said frame which contains said film and moving the substrate vertically through the liquid surface.

3. An apparatus for forming a monomolecular film or a monomolecular built-up film on a substrate, which comprises a tank, a frame for dividing a liquid surface in said tank, a plurality of float means within said frame and a means for moving the substrate horizontally in the liquid without disordering the liquid surface within said frame which contains said film.

4. A film forming apparatus according to claim 3, in which said float means is capable of isolating two or more different monomolecular layers formed on a liquid surface for spreading the monomolecular layers.

5. An apparatus for forming a monomolecular film or a monomolecular built-up film on a substrate, which comprises a tank, a frame for dividing a liquid surface in said tank, a plurality of float means within said frame and a means for moving the substrate horizontally in the liquid without disordering the liquid surface whithin said frame which contains said film and moving the substrate vertically through the liquid surface.

6. A film forming apparatus according to claim 5, in which said float means is capable of isolating two or more different monomolecular layers formed on a liquid surface for spreading the monomolecular layers.

* * * * *

UNITED STATES PATENT AND TRADEMARK OFFICE
CERTIFICATE OF CORRECTION

PATENT NO. : 4,674,436   Page 1 of 2
DATED : June 23, 1987
INVENTOR(S) : TOSHIHIKO MIYAZAKI, ET AL.

It is certified that error appears in the above-identified patent and that said Letters Patent is hereby corrected as shown below:

COLUMN 1

Line 18, "in" should read --of--.
    Line 30, "he" should read --the--.

COLUMN 2

Line 43, "built-" should read --build- --.

COLUMN 3

Line 15, "hetereoconstruc-" should read --heteroconstruc- --.
    Line 26, "invention" should read --invention,--.
    Line 35, "invention" should read --invention,--.
    Line 68, "ment." should read --ment;--.

COLUMN 4

Line 5, "apparatus;" should read --apparatus; and--.
    Line 47, "is" should read --are--.

COLUMN 5

Line 23, "ratation" should read --rotation--.
    Line 45, "peressure" should read --pressure--.
    Line 45, "(hot" should read --(not--.

UNITED STATES PATENT AND TRADEMARK OFFICE
CERTIFICATE OF CORRECTION

PATENT NO. : 4,674,436
DATED : June 23, 1987
INVENTOR(S) : TOSHIHIKO MIYAZAKI, ET AL.

It is certified that error appears in the above-identified patent and that said Letters Patent is hereby corrected as shown below:

COLUMN 6

Line 5, "3fand" should read --3f and--.
Line 54, "surely" should read --reliably--.

COLUMN 8

Line 12, "whithin" should read --within--.

Signed and Sealed this

Fifteenth Day of December, 1987

Attest:

DONALD J. QUIGG

*Attesting Officer*   *Commissioner of Patents and Trademarks*